(12) United States Patent
Nishiwaki et al.

(10) Patent No.: US 7,823,697 B2
(45) Date of Patent: Nov. 2, 2010

(54) LUBRICATING PLUG AND STUD-TYPE TRACKING WHEEL WITH THE SAME

(75) Inventors: Kenjiro Nishiwaki, Mino (JP); Takashi Tanimoto, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 989 days.

(21) Appl. No.: 11/079,771

(22) Filed: Mar. 15, 2005

(65) Prior Publication Data

US 2005/0199446 A1    Sep. 15, 2005

(30) Foreign Application Priority Data

Mar. 15, 2004    (JP)    ................................ 2004-072726

(51) Int. Cl.
*F01M 11/04*    (2006.01)

(52) U.S. Cl. .................. 184/105.3; 184/105.1; 384/474

(58) Field of Classification Search .............. 184/105.1, 184/105.3, 5.1; 384/482, 462, 466, 473, 384/474; 220/374; 74/606 R
See application file for complete search history.

(56) References Cited

U.S. PATENT DOCUMENTS

| | | | | |
|---|---|---|---|---|
| 2,265,554 A | * | 12/1941 | Thomas | 74/569 |
| 2,770,508 A | * | 11/1956 | Smith | 384/477 |
| 3,596,533 A | * | 8/1971 | Nightingale | 74/559 |
| 4,106,826 A | * | 8/1978 | Marola et al. | 384/466 |
| 4,113,327 A | * | 9/1978 | Koch | 384/482 |
| 4,310,206 A | * | 1/1982 | Weible | 384/466 |
| 4,927,272 A | * | 5/1990 | Ward, Jr. | 384/13 |
| 5,010,925 A | * | 4/1991 | Atkinson et al. | 137/847 |
| 5,141,498 A | * | 8/1992 | Christian | 604/167.03 |
| 5,261,459 A | * | 11/1993 | Atkinson et al. | 137/846 |
| 5,269,763 A | * | 12/1993 | Boehmer et al. | 604/167.04 |
| 5,301,707 A | * | 4/1994 | Hofsteenge | 137/12 |
| 5,411,491 A | * | 5/1995 | Goldhardt et al. | 604/247 |
| 5,443,452 A | * | 8/1995 | Hart et al. | 604/167.03 |
| 5,456,284 A | * | 10/1995 | Ryan et al. | 137/522 |
| 5,496,280 A | * | 3/1996 | Vandenbroek et al. | 604/167.03 |
| 5,803,919 A | * | 9/1998 | Hart et al. | 604/167.04 |
| 5,897,828 A | * | 4/1999 | Sillince et al. | 264/504 |
| 5,924,452 A | * | 7/1999 | Szpara et al. | 137/846 |
| 6,015,237 A | * | 1/2000 | Ogawa | 384/475 |
| 6,017,152 A | * | 1/2000 | Ogawa et al. | 384/466 |
| 6,024,729 A | * | 2/2000 | Dehdashtian et al. | 604/256 |

(Continued)

FOREIGN PATENT DOCUMENTS

JP    10-196648 A    7/1998

*Primary Examiner*—Bradley T King
*Assistant Examiner*—Thomas Irvin
(74) *Attorney, Agent, or Firm*—Browdy and Neimark, PLLC

(57) ABSTRACT

A lubricating plug is provided which may be applied easily to the stud-type roller bearing with tracking wheel, roller, whether new or already existing, with no need of adding any modification to design of a lubrication hole. The lubricating plug is most suitable for certain replenishment of lubricant and also made slim in construction even with low cost. The lubricating plug is comprised of a radially enlarged portion of cylindrical contour adapted to make the fit-engagement with the lubrication hole in the stud, and a radially reduced portion made integral with the radially enlarged portion. An injection hole is bored throughout in both the radially enlarged portion and the radially reduced portion to accommodate detachably therein a lubricant feeder nozzle.

2 Claims, 5 Drawing Sheets

U.S. PATENT DOCUMENTS 6,056,444 A * 5/2000 Ogawa et al. ............... 384/475
6,461,335 B1 * 10/2002 Noecker .................... 604/246
7,217,277 B2 * 5/2007 Parihar et al. ............... 606/167
2005/0077109 A1 * 4/2005 Ito et al. .................... 184/6.11

* cited by examiner

LUBRICATING PLUG AND STUD-TYPE TRACKING WHEEL WITH THE SAME

FIELD OF THE INVENTION

The present invention relates to a lubricating plug suitable for use in a lubrication hole to apply lubricant to any assembly unit including a bearing and so on composed of components movable relatively to one another and relating to a stud-type tracking wheel installed with the lubricating plug.

BACKGROUND OF THE INVENTION

Conventionally, a stud-type tracking wheel, generally called a cam follower, is a sort of roller bearing in which an outer ring thick in radial dimension fits over a stud for free rotation through more than one rolling element of needle interposed between them. The outer ring serves as a tracking wheel coming into rolling-contact with a race on any mating member including a cam and so on, while the stud has any joint including a thread, abutment, and so on to easily fasten it to any associated member.

Many sorts of stud-type roller bearing with tracking wheel have been heretofore used for the cam follower. A prior stud-type roller bearing with tracking wheel is disclosed in, for example Japanese Patent Laid-Open No. 1998-196648 in which an inner race or stud installed in an outer race for rotation has a shaft extending out of the outer race in axial direction, which is used to support the roller bearing on any associated member in a cantilevered fashion. The stud is made with a lubrication hole to accommodate a lubricating plug therein. The lubrication hole communicates with passages to allow lubricant to reach the raceways on which the roller rolls. The lubrication hole also communicates with a hexagonal socket that is made on an axial end of the stud. Moreover, another lubrication hole to accommodate the lubricating plug therein is provided at an externally threaded end of the stud. The prior stud-type roller bearing with tracking wheel constructed as stated earlier is easier to mount and/or demount it from any other machines such as machine tool or the like as well as possible to produce it at low cost.

In recent years, the small stud-type roller bearing with tracking wheel has been frequently seen in diverse machines and instruments and needed having a built-in lubricating plug that makes it possible to replenish the rollers with lubricant. Nevertheless, the stud-type roller bearing with tracking wheel, especially, small stud-type roller bearing, because of the stud with less redundancy on it for installation of a grease nipple, is very tough to carry out replenishment of lubricant. A previous approach to the resolution of the problem as stated just above is the stud-type roller bearing with tracking wheel in which the lubricating plug is installed in the lubrication hole in the stud, which is disclosed in the senior application of the common assignment recited earlier.

With the prior stud-type roller bearing with tracking wheel where the lubricating plug is installed in the lubrication hole in the stud, however, since the lubricating plug is made in a bumpily intricate configuration, the mold to produce the lubricating plug has to become sophisticated in cavity contour, thereby very difficult to form the mold. This results in the major problem that the prior lubricating plug costs too high to qualify for the small stud-type roller bearing with tracking wheel. With the prior stud-type roller bearing with tracking wheel constructed as recited earlier, in addition, the lubricating plug is provided therein a hollow chamber extending straight in axial direction. In alignment of the end face of the lubricating plug with the lubrication hole lying normal to the axis of the stud, there is a practical issue that an outlet of the hollow chamber made open on the end face of the lubricating plug must be determined in the precise position relative to the lubrication hole in the stud.

With the prior small stud-type roller bearing with tracking wheel, especially, small stud-type roller bearing in which the stud is not more than 10 mm in diameter d in FIG. 3, there is less in room to install the grease nipple there and the grease nipple itself has to be made as small as possible. Thus, the prior small stud-type roller bearing with tracking wheel gets substantially impossible to replenish it with lubricant. In the prior small stud-type roller bearing with tracking wheel in which there are provided a lubrication hole as shown at 10 in FIG. 3 and a lubricant passage shown at 22 in FIG. 3 extending normal to the lubrication hole, a plug such as ball or the like is pressed into the lubrication hole lest any contaminant including foreign matter, debris, and so on invades or any oily material leaks out through the lubrication hole after the lubricant such as grease and the like has been once applied into the race through the lubrication hole.

SUMMARY OF THE INVENTION

The present invention, therefore, has as its primary object to overcome the problems as stated earlier and more particular to provide a lubricating plug improved to fit easily into a lubrication hole made in an assembly unit composed of components movable relatively to one another. Another object of the present invention is the provision of a stud-type roller bearing with tracking wheel suitable for easier installation of the improved lubricating plug. The lubricating plug according to the present invention makes it easier to install it into the already existing lubrication hole in any component of the assembly unit without needing to add substantial constructional modification to the already existing lubrication hole, making sure of certainly replenishing the assembly unit with lubricant. The lubricating plug according to the present invention is further made compact in construction and easier in production even with inexpensive cost.

The present invention is concerned with a lubricating plug adapted to fit into a lubrication hole made in an assembly unit including a bearing composed of members movable relatively to one another; comprising a radially enlarged portion of a cylindrical contour to fit into the lubrication hole and a radially reduced portion of a cylindrical contour, which is integral with the radially enlarged portion; and wherein both the radially enlarged and reduced portions are made throughout with an injection hole extending in an axial direction to receive detachably a lubricant feeder nozzle therein.

In one aspect of the present invention, there is provided a lubricating plug in which the injection hole includes an ingress area made opened at an axially end of the radially enlarged portion and extended inwards in the axial direction to accommodate the lubricant feeder nozzle therein, and an egress area made communicated with the egress area and smaller in diameter than the egress area. Moreover, the ingress area is made in a way tapering off from the axially end of the radially enlarged portion towards the egress area.

In another aspect of the present invention, there is provided a lubricating plug in which a boundary between the ingress area and the egress area is made in a flat abutment against which the lubricant feeder nozzle is allowed coming into abutted engagement.

In another aspect of the present invention, there is provided a lubricating plug in which the radially enlarged and reduced portions are both made in integral construction by molding any one of synthetic resin and synthetic rubber. In a further another aspect of the present invention, the radially enlarged portion has a flange that is adapted to come into abutment against the assembly unit, while the radially reduced portion is provided at a forward end thereof with slots intersecting the egress area to open the egress area outside.

The present invention is also concerned with a stud-type roller bearing with tracking wheel; comprising an outer ring serving as a wheel coming into rolling-contact with a raceway on any mating member, a stud including an inside race installed in the outer ring for rotation relative to one another and a shaft integral with the inside race and extending axially out of the outer ring, the inside race being provided therein a lubrication hole, the shaft being cut with external threads around a free end area thereof, and more than one rolling element interposed between the outer ring and the stud; and wherein a lubricating plug fits into the lubrication hole made in the inside race, the lubricating plug being comprised of a radially enlarged portion of a cylindrical contour to fit into the lubrication hole and a radially reduced portion of a cylindrical contour, which is integral with the radially enlarged portion, both the radially enlarged and reduced portions being made throughout with an injection hole extending in an axial direction to receive detachably a lubricant feeder nozzle therein, and the injection hole including an ingress area made opened at an axially end of the radially enlarged portion and tapered inwards in the axial direction to accommodate the lubricant feeder nozzle therein, and an egress area being made communicated with the egress area and smaller in diameter than the egress area.

In another aspect of the present invention, there is provided a stud-type roller bearing with a tracking wheel in which the lubrication hole includes an opening to receive therein the lubricating plug, and a mouth extending from the opening to the axial end of the inside race to mate with any fastening tool, the lubrication hole further communicating with a lubricant path made in the inside race to open onto a raceway surface on the inside race.

In another aspect of the present invention, there is provided a stud-type roller bearing with a tracking wheel in which lubricant applied from the lubricant feeder nozzle received in the ingress area flows through the egress area of the lubricating plug and plural slots 7 into a clearance around the radially reduced portion, followed by pouring into the lubricant path 22 arranged in a direction perpendicular to the lubrication hole.

In another aspect of the present invention, there is provided a stud-type roller bearing with a tracking wheel in which the radially reduced portion is provided at a forward end thereof with slots intersecting the egress area to open the egress area outside.

In a further another aspect of the present invention, there is provided a stud-type roller bearing with a tracking wheel in which the lubricating plug is colored different from the stud, thereby making it easy to tell the stud from the ingress area of the lubricating plug that has been once inserted in the lubrication hole in the stud.

The lubricating plug constructed as stated earlier is made more simplified in construction, and correspondingly a mold cavity used to produce the lubricating plug is modest in contour, making it possible to mold easily the lubricating plug. With the stud-type roller bearing with tracking wheel constructed as stated earlier, the lubricating plug may be set in place in the stud by only pushing it into the lubrication hole, so that the installation of the lubricating plug into the lubrication hole in the stud can be carried out easier.

DETAILED DESCRIPTION OF THE PREFERRED EMBODIMENTS

Preferred embodiments of a lubricating plug constructed according to the present invention and a stud-type roller bearing with tracking wheel in which there is installed the lubricating plug will be explained hereinafter in detail with reference to the accompanying drawings.

The lubricating plug of the present invention is intended installing it into any relatively movable members including the rolling-contact bearing, especially, the stud-type roller bearing with tracking wheel, which needs replenishment with lubricant. Further, the stud-type roller bearing with tracking wheel of the present invention would well serve as cam mechanisms, linear motion guides, and so on, which are applied to a wide variety of machines including, for example, machine tools, industrial robots, assembly machines for electronic parts, office automation machines, and so forth.

Figure 1:
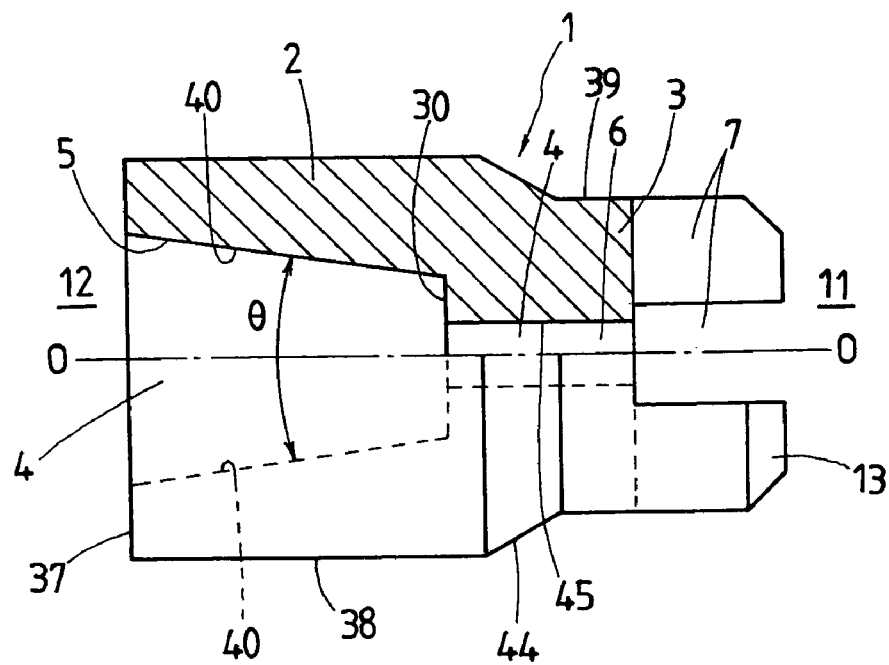
FIG. 1 is a view in front elevation, partially in longitudinal section taken along the line A-O-A on the axis O of FIG. 2, showing a preferred embodiment of a lubricating plug according to the present invention.
Figure 2:
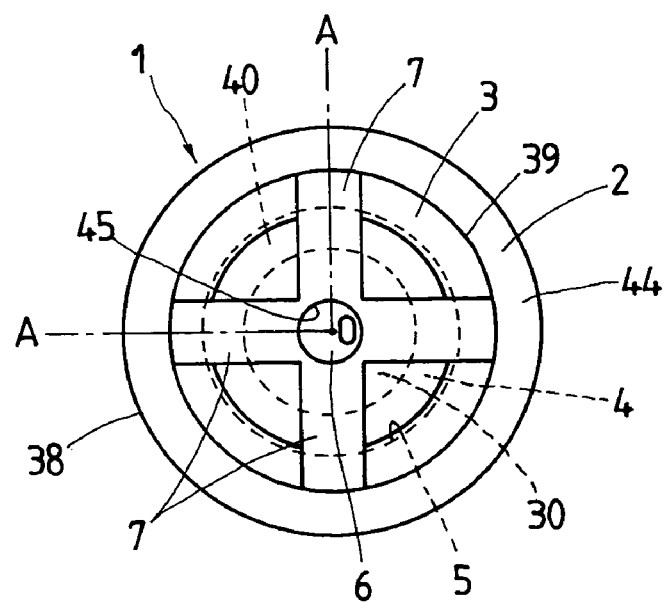
FIG. 2 is a view in right side elevation showing the lubricating plug of FIG. 1.

Referring to FIGS. 1 and 2, there is shown a preferred embodiment of the lubricating plug of the present invention. The lubricating plug 1 of the present invention is made more simplified in construction, compared with the prior lubricating plug, and correspondingly a mold cavity used to produce the lubricating plug is modest in contour, making it possible to mold easily the lubricating plug at low cost. The lubricating plug 1 of the present invention is intended making it possible to install easily the lubricating plug into a lubrication hole that is formed in an assembly unit composed of members relatively movable one another, especially in a stud-type roller bearing with tracking wheel. The lubricating plug 1 of the present invention is moreover concerned with universally fitting into any already existing lubrication hole made in the stud-type roller bearing with tracking wheel. The lubricating plug 1 of the present invention is most adaptable for, especially, small stud-type roller bearing with tracking wheel to replenish the roller bearing with lubricant, which is delivered with a lubricant feeder nozzle through the lubricating plug 1. The lubricating plug 1 of the present invention is serviceable for a variety of lubrication systems.

Figure 3:
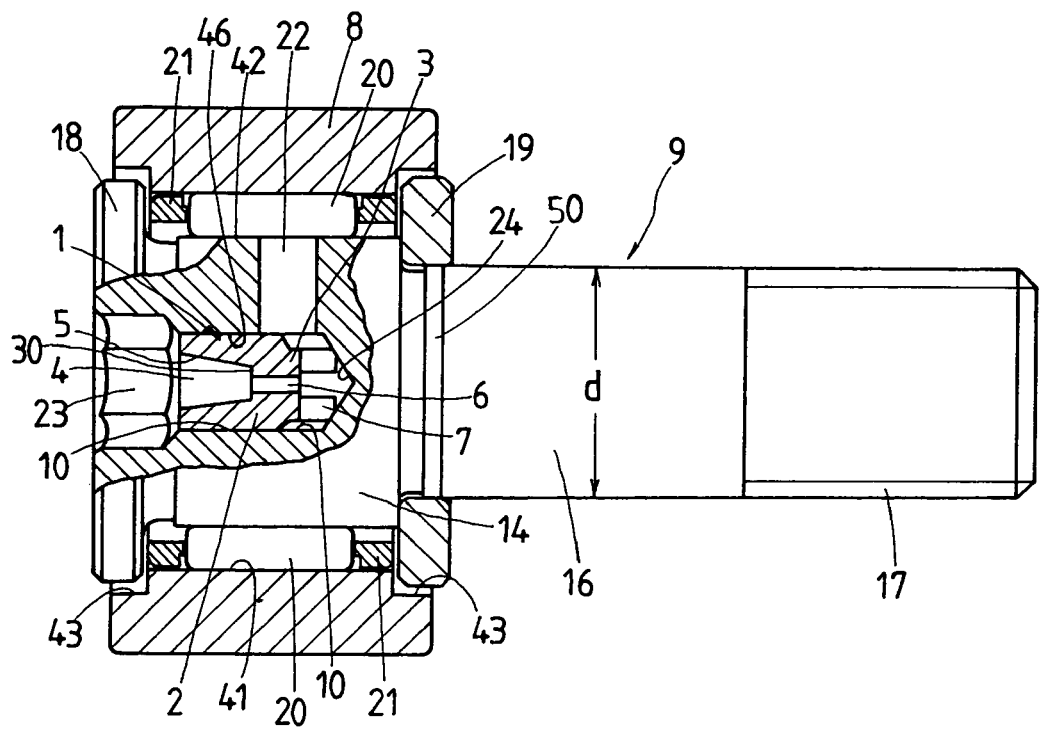
FIG. 3 is a view in front elevation, partially in section and partially broken away, showing a preferred embodiment of a stud-type roller bearing with tracking wheel in which there is installed the lubricating plug of FIG. 1.

The lubricating plug 1 of the present invention is intended to fit into a lubrication hole 10, refer to FIG. 3, that is made in an assembly unit composed of members relatively movable one another, especially in a bearing. The lubricating plug 1 is mainly comprised of a radially enlarged portion 2 of cylindrical contour 38 including right circular cylinder and so on designed so as to fit closely into the lubrication hole 10, and a radially reduced portion 3 extending integrally from any one of axially opposite ends of the enlarged portion 2 and having a cylindrical contour 39 including right circular cylinder and so on, which is made smaller in diametral dimension than the radially enlarged portion 2. An injection hole is bored through both the radially enlarged and reduced portions 2 and 3 to extend on an axis O throughout the overall axial length of the lubricating plug 1. The injection hole is made to allow a lubricant feeder nozzle 15, shown in FIG. 5, to enter the injection hole from the radially enlarged portion 2 towards the radially reduced portion 3 to thereby fit snugly into the injection hole. As seen in FIG. 1, a boundary contour between the radially enlarged and reduced portions 2 and 3 is made in a tapered contour 44 that reduces gradually in diametral dimension as advancing from the radially enlarged portion 2 towards the radially reduced portion 3. Moreover, the radially reduced portion 3 is chamfered on an axially forward edge surface 11 to have a slantwise surface 13. The forward edge surface 11 of the radially reduced portion 3 and an edge surface 37 on an aft end 12 of the radially enlarged portion 2 are both made in flat surface extending in perpendicular to the axis O of the lubricating plug 1.

The injection hole 4 extending on the axis O of the lubricating plug 1 is made up of an ingress area 5 into which the lubricant feeder nozzle 15 is inserted from the edge surface 37 of the radially enlarged portion 2, and an egress area 6 connected with the ingress area 5 and made smaller in diametral dimension than the ingress area 5. Moreover, the ingress area 5 is made in a tapered hole 40, which is tapered down with an angle θ as advancing from the edge surface 37 of the radially enlarged portion 2 towards the egress area 6 that is a straight hole 45 communicating with the tapered hole 40. A boundary between the ingress area 5 and the egress area 6, as seen in FIG. 1, is within the radially enlarged portion 2. Moreover, the boundary between the ingress area 5 and the egress area 6 is made in a flat abutment 30 against which the lubricant feeder nozzle 15 is allowed coming into close engagement. The radially reduced portion 3 is provided therein with more than one slot 7 to open the egress area 6 to the outside of the radially reduced portion 3. The slots 7, especially shown in FIG. 2, are made in the form of a cross consisting of a vertical slot 7 and a horizontal slot 7 across it on the egress area 6. As apparent from FIG. 1, the slot 7 is cut in perpendicular to the egress area 6.

The lubricating plug 1 composed of the radially enlarged and reduced portions 2 and 3 may be integrally made of synthetic resin or synthetic rubber with using a mold cavity simple in contour. As a result, the lubricating plug 1 can be molded easily at inexpensive cost. With the lubricating plug 1 constructed as stated earlier, either the radially enlarged and reduced portions 2 and 3 are made smooth or gentle in contour as opposed to the prior lubricating plug having the bumpily intricate contour. The ingress area 5 of the injection hole is defined by the tapered hole 40 divergent outwardly while the egress area 6 of the injection hole is made straight so as to extend across the ingress area 5. The constructional features in the lubricating plug 1 of the present invention helps render the mold cavity simple in construction. Material to produce the lubricating plug 1 may be selected from synthetic rubber of versatile butadiene-acrylonitrile rubber and synthetic resin including polyacetal, polypropylene, and so forth.

Figure 5:
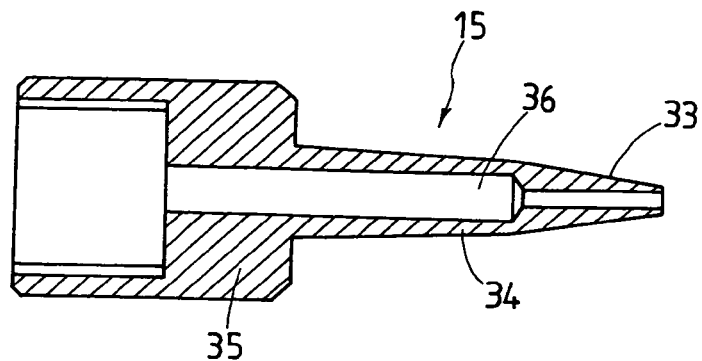
FIG. 5 is a view in longitudinal section showing a lubricant feeder nozzle.

The injection hole 4 made in the lubricating plug 1, as shown in FIG. 5, is utilized to receive the lubricant feeder nozzle 15 such as a grease gun and so on to inject any lubricant including grease, lubricating oil, and so on, especially grease into the roller bearing. The lubricant feeder nozzle 15 is connected to a lubricant supply port of the grease gun and composed of a radially major portion 35, a radially minor portion 34, and a tapered nose 33, which are all made integral together. An axial passage 36 to allow the lubricant to flow through there is made to extend throughout the overall axial length of the radially major portion 35, radially minor portion 34 and the tapered nose 33. The lubricant feeder nozzle 15 is inserted from the aft end 12 of the lubricating plug 1 into the ingress area 5, reaching the egress area 6. The egress area 6 of the injection hole 4 is made tiny in caliber, for example not more than φ 1 mm, preferably φ 0.5 mm to keep the roller bearing against contaminants including foreign matter, dirt, and so on. When the ingress area 6 of the lubricating plug 1 is too tiny in caliber, the lubricant will be harder to flow through there. Moreover, the boundary between the ingress area 5 and the egress area 6 is made in the flat abutment 30 against which the lubricant feeder nozzle 15 is allowed coming into abutted engagement. This constructional feature makes sure of the lubricant feeder nozzle 15 being kept against wedging deep into the injection hole. Thus, the lubricant feeder nozzle 15 can be easily inserted into and/or withdrawn out of the ingress 5 of the lubricating plug 1.

The ingress area 5 of the injection hole 4 defines the tapered hole 40 that is made complementary to the contour of the tapered nose 33 of the lubricant feeder nozzle 15. For making certain of proper close-fit of the tapered nose 33 of the lubricant feeder nozzle 15 into the tapered hole 40 in the ingress area 5, the tapered hole 40 in the ingress area 5 is made slightly less in tapering angle than the nose 33 of the lubricant feeder nozzle 15 so that there is provided a somewhat negative allowance between the mating tapered circular surfaces of the ingress area 5 of the injection hole 4. That is to say, when the circular outside surface 33 of the lubricant feeder nozzle 15 is made tapered at, for example, an angle of 18 deg, the circular surface 40 inside the ingress area 5 of the lubricating plug 1 is made tapered at an angle θ, which is only slightly less than 18 deg, for example, 16 deg. When the lubricant feeder nozzle 15 is thrust into the ingress area 5, thus, the tapered hole 40 inside the ingress area 5 undergoes an elastic deformation, thereby coming into close-fit with the lubricant feeder nozzle 15. It will be noted that the lubricant feeder nozzle 15 shown in FIG. 5 is made versatile in contour for any commonly used grease gun. Although the ingress area 5 may be made in a hole uniform in diametral dimension across the overall length thereof, not shown, the tapered hole 40 is more appropriate for easy fit with the lubricant feeder nozzle 15, simple connection and/or disconnection from the lubricant feeder nozzle 15, making ensure of the close fit with the lubricant feeder nozzle 15, and keeping securely the lubricant against leakage.

Figure 4:
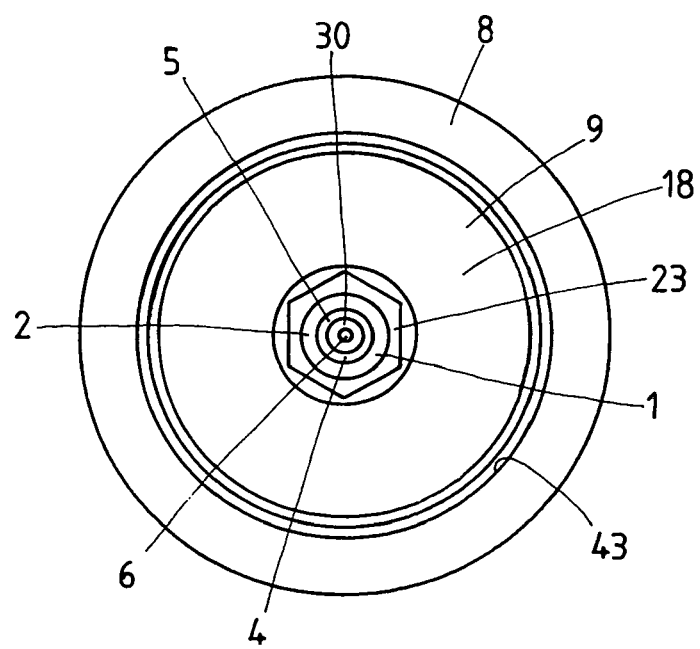
FIG. 4 is a view in left side elevation showing the stud-type roller bearing with tracking wheel of FIG. 3.

Referring to FIGS. 3 and 4, there is shown a stud-type roller bearing with tracking wheel according to the present invention.

The stud-type roller bearing with tracking wheel is of the style where an inner ring or a stud 9 is mounted to any associated member in a cantilevered fashion. The stud 9 is made up of an inside race 14 fit in the outer ring 8, and a shaft 16 extending out of the roller bearing and having an external thread 17 around a remote area thereof. The stud-type roller bearing with tracking wheel is comprised of the outer ring 8 made thick in radial direction to serve as a tracking wheel coming into rolling-contact with the mating member, the stud 9 made up of the inside race 14 installed in the outer ring 8 for rotation relative to one another and the shaft 16 integral with the inside race 14 and extending axially out of the outer ring 8, the shaft 16 being cut with the external threads 17 around the free end area thereof, and more than one needle 20 for rolling element interposed between the outer ring 8 and the inside race 14 of the stud 9, and replenished with lubricant. The inside race 14 of the stud 9 is provided on axially opposite sides thereof with a flange 18 adjacent to one side of the inside race 14 far away from the shaft 16 and a side plate 19 held around an engaging part 50 in adjacency with another side of the inside race 14. After the stud 9 has fit into the outer ring 8, the flange 18 fits in an recess 43 at the side of the inside race 14 far away from the shaft 16 to keep the outer ring 8 against falling away from the inside race 14 while the retainer plate 19 fits in another recess 43 at another side of the inside race 14 to keep the outer ring 8 against axial displacement relative to the inside race 14. More than one needle 20 is installed in a rolling element raceway defined between the circular raceway surface 41 of the outer ring 8 and the circular raceway surface 42 of the inside race 14 so as to roll through the raceway with kept in axial direction with axially opposite retainers 21.

The stud-type roller bearing with tracking wheel constructed as stated earlier has a lubrication hole 10 adapted to accommodate therein the lubricating plug 1 that has the constructional features as described above. The lubrication hole 10 includes an opening 46 to receive therein the lubricating plug 1 and a mouth 23 made in, for example, a hexagonal shape extending from the opening 46 to the axial end of the inside race 14 to mate with any fastening tool, not shown. The inside race 14 is further made with a lubricant path 22 extending from the lubrication hole 10 in a direction normal to the raceway surface 42 around the inside race 14, as shown in FIG. 3.

Upon installation of the lubricating plug 1 into the lubrication hole 10 in the stud 9 of the stud-type roller bearing with tracking wheel, the lubricating plug 1 is forced into the lubrication hole 10 until the forward edge 13 of the radially reduced portion 3 of the lubricating plug 1 comes into abutment against a deep bottom 24 of the lubrication hole 10, so that the lubricating plug 1 will be kept at a desired place in the lubrication hole 10. Alternatively, the lubricating plug 1 is urged into the lubrication hole 10 until the aft edge surface 37 of the radially enlarged portion 2 comes into flush relation with a circular boundary between the opening 46 and the mouth 23, so that the lubricating plug 1 will be kept at a desired place in the lubrication hole 10. Thus, it will be understood that the lubricating plug 1 may be installed easily in place relatively to the lubrication hole 10. The lubricant oiled from the lubricant feeder nozzle 15 fit into the ingress area 5 flows into the lubricant path 22 through the egress area 6, slots 7 in the lubricating plug 1, and then lubrication hole 10 around the radially reduced portion 3, followed by reaching the raceway 47 defined between the circular raceway surface 41 inside the outer ring 8 and the circular raceway surface 42 outside the inside race 14 to allow the needles 20 to roll through there.

For making it easy to tell the inside race 14 of the stud 9 from the ingress area 5 of the lubricating plug 1 that has been once inserted in the lubrication hole 10 in the stud 9, the lubricating plug 1 is colored different from the inside race 14. For example, the inside race 14 is painted in black while the lubricating plug 1 is colored in blue. Thus, the operator can easily tell the lubricating plug 1 and the inside race 14 of the stud 9 apart even in faint light and can apply easier the lubricant feeder nozzle 15 to the ingress area 5 of the lubricating plug 1. The different coloring system helps recognize with clarity the existence of the lubricating plug 1 that has already fit into the lubrication hole 10 in the stud 9 or inside race 14. The lubricating plug 1, although explained as being colored blue in the above to be discernible with clarity, may be painted with any desired color other than blue including white. But it is preferable that the lubricating plug 1 is colored in blue because of easily distinguishable even after stained.

It is said that the lubricating plug 1 is most suitable for a tiny stud in which the lubricant path 22 is made in perpendicular to the lubrication hole 10. The lubricating plug 1 helps keep the lubricant against leakage with no use of any additional plug in the lubrication hole 10, because the egress area 6 made therein is small enough to keep the lubricant against any backward flow through there.

The lubricating plug 1, since having the slots 7 crossing one another relatively to the injection hole, may be applied to any already existing stud-type roller bearing with tracking wheel, with no need of making any change in geometry of the lubricant path 22 in the stud 9, thereby allowing the lubricant in the lubricating plug 1 to flow smoothly from the injection hole into the lubricant path 22. The lubricating plug 1, even made in considerably tiny construction, may be easily applied to any lubrication hole 10 that has been already made in the existing stud 9.

With the stud-type roller bearing with tracking wheel in which the lubricating plug 1 fits in the lubrication hole 10 formed in the stud 9, the lubrication hole 10 terminates in the hexagonal socket 23 that is made on an axial end of the stud so as to make engagement with the fastening tool to connect the stud 9 with the associated parts or mating member. The lubricating plug 1, because of fitting in the lubrication hole 10 with the forward edge 13 coming into abutment against the deep bottom 24 of the lubrication hole 10 as shown in FIG. 3, is seated securely in the lubrication hole 10. Thus, even if the lubricant feeder nozzle 15 is urged more intensely against the lubricating plug 1 while feeding the lubricant to the stud-type roller bearing with tracking wheel, there is no practical issue that the lubricating plug 1 is urged more deeply into the lubrication hole 10 so that smooth replenishment of lubricant can be certainly ensured for the stud-type roller bearing with tracking wheel.

The radially reduced portion 3 of the lubricating plug 1 is provided with the slots 7 to open the egress area 6 to a space around the cylindrical contour 39. Thus, the lubricant applied from the lubricant feeder nozzle 15 received in the ingress area 5 of the lubricating plug 1 flows through the egress area 6 and plural slots 7 into the lubricant path 22, followed by pouring into the lubricant path 22 arranged around the radially reduced portion 3 in the direction perpendicular to the lubrication hole 10, and then reaching the raceway defined between the circular raceway surface 41 inside the outer ring 8 and the circular raceway surface 42 outside the inside race 14. The lubricant path 22 is made open to the raceway surface 42 of the stud 9 at only one location in circumferential direction, whereas the four slots 7 are made crossed. Moreover, there is provided a circular clearance extending around the radially reduced portion 3, that is, between the lubrication hole 10 and the radially reduced portion 3 to communicate the lubricant path 22 with the slots 7. Upon coupling the lubricating plug 1 to the stud 9, thus, the operator has only to push the lubricating plug 1 into the lubrication hole 10 without paying any attention to the relative location of the lubricating plug 1 to the lubrication hole 10 in the circumferential direction. Further, the constructional feature as stated just earlier helps ensure the smooth of lubricant from the injection hole into the lubricant path 22. The lubricating plug 1 will fit into the lubrication hole 10 in a way that the radially enlarged portion 2 makes close-fit in the lubrication hole 10 with leaving the circular clearance around the radially reduced potion 3.

With the stud-type roller bearing with tracking wheel constructed as stated earlier, the lubricating plug 1 is completely concealed in the lubrication hole 10 so as not to rise into the hexagonal mouth 23 and, therefore, the fastening tool may be applied to the hexagonal mouth 23 whenever the operator wants to do so.

Figure 6:
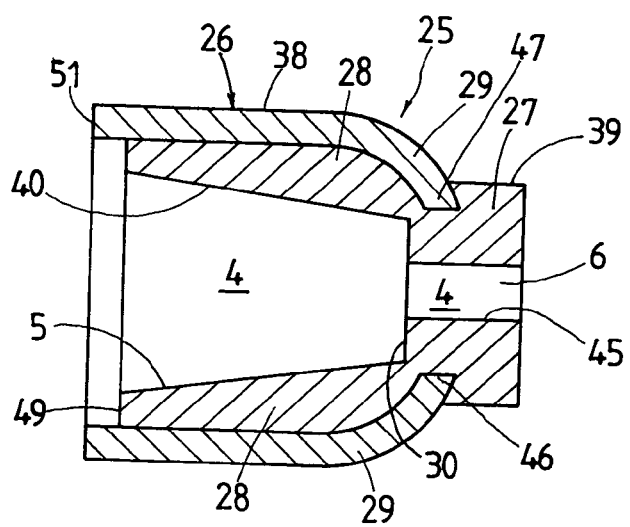
FIG. 6 is a view in longitudinal section showing another version of the lubricating plug according to the present invention.
Figure 7:
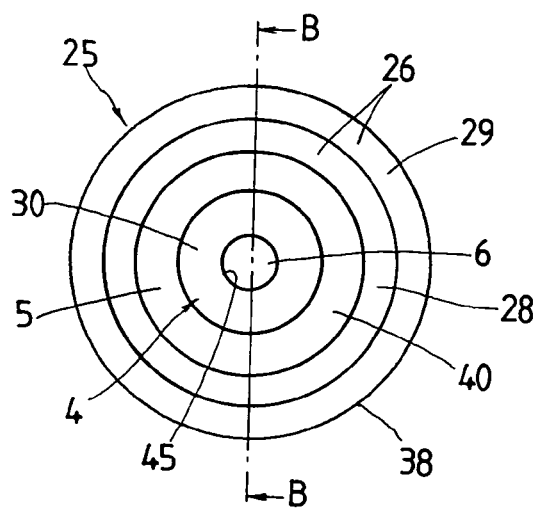
FIG. 7 is a view in left side elevation showing the lubricating plug of FIG. 6.

Referring next to FIGS. 6 and 7, there is shown another version of the lubricating plug of the present invention.

A modified lubricating plug 25 for replenishment of lubricant has a radially enlarged portion 26 composed of a radially enlarged core 28 and an outside metal shield 29 surrounding around the enlarged core 28, and a radially reduced core 27 integral with the radially enlarged core 28. The metal shield 29 is made curved so as to allow any one end 47 of axially opposite ends to fit closely over the outside contour around the radially enlarged core 28. The metal shield 29 bites at the axial end 47 thereof into a circular groove 46 cut along a boundary between the radially enlarged core 28 and the radially reduced core 27. The injection hole 4 includes the ingress area 5 in the form of the tapered hole 40, and the egress area 6 connected with the ingress area 5 and made uniform in diametral dimension. As shown in FIG. 6, the radially enlarged core 28 recedes inwards at an open circular end 49 thereof below an open circular end 51 of the metal shield 29 so that the injection hole 4 is provided therein with a sort of circular shoulder. The core member constituting the radially enlarged and reduced cores 28, 27, as with the first embodiment stated earlier, is molded integrally using synthetic rubber or synthetic resin. In the version discussed here, the core member is made of butadiene-acrylonitrile rubber (NBR).

Figure 8:
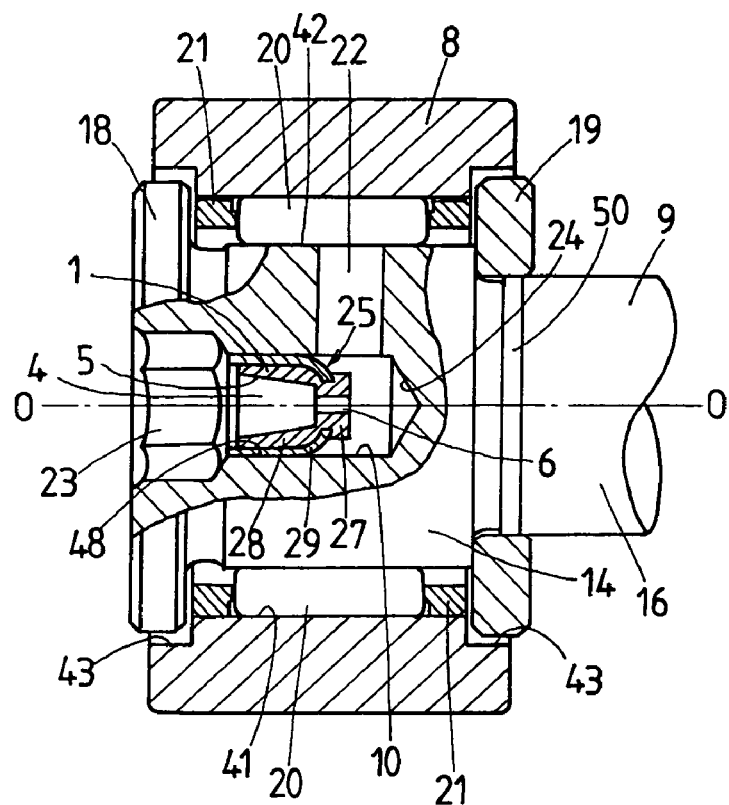
FIG. 8 is a view in front elevation, partially in section and partially broken away, showing another version of a stud-type roller bearing with tracking wheel in which there is installed the lubricating plug of FIG. 6.

Another version of the stud-type roller bearing with tracking wheel will be explained hereinafter with reference to FIG. 8.

This version has the same construction as the first embodiment stated earlier with reference to FIG. 3, except using the lubricating plug 25 different from the lubricating plug 1 for the lubrication hole 10. The lubricating plug 25, as shown in FIG. 8, fits closely in the lubrication hole 10 in a way the outside shield 29 makes the intensely engagement with the inside wall of the lubrication hole 10 in the inside race 14. The lubricating plug 25, because of firmly held in the lubrication hole 10 around the outside shield 29, remains in an ingress area 48 in the lubrication hole 10 with the foremost end thereof being spaced apart from the deep bottom 24 of the lubrication hole 10. Upon installation of the lubricating plug 25 in the lubrication hole 10, the lubricating plug 25 is pushed into the lubrication hole 10 until the trailing circular end 51 of the outside shield 29 of the lubricating plug 25 reaches the circular boundary between the opening 46 and the mouth 23, so that the lubricating plug 25 will be kept at a desired place in the lubrication hole 10. Thus, the lubricating plug 25 may be installed easily in place relatively to the lubrication hole 10. Thus, even if the lubricant feeder nozzle 15 is urged more intensely against the lubricating plug 25 while feeding the lubricant such as grease and the like through the lubricating plug 25, there is no practical issue that the lubricating plug 25 is urged more deeply into the lubrication hole 10. The reason is that the lubricating plug 25 is securely held in the lubrication hole 10 by virtue of the firm engagement of the outside shield 29 with the circular wall inside the lubrication hole 10 while the lubricant feeder nozzle 15 is kept against urged more deep into the injection hole by coming into abutted engagement against the flat abutment 30 lying at the boundary between the ingress area 5 and the egress area 6. Thus, the smooth replenishment of lubricant can be certainly ensured for the stud-type roller bearing with tracking wheel.

With the lubricating plug 25 in which the radially reduced core 27 is made extending forwards beyond the leading end of the outside shield 29 surrounding around the radially enlarged core 26, the provision of the radially reduced core 27 makes it easier to mold the radially enlarged core 28 joined integrally with the outside shield 29 in a way biting at the axial end 47 thereof into a circular groove 46 cut along a boundary between the radially reduced core 27 and the radially enlarged core 28. The radially reduced core 27 is made smaller in diameter than the lubrication hole 10. Regardless of whether the lubricant path 22 is made overlapped in position with the radially reduced core 27, that is, intersected with reduced core 27 or not, the lubricant applied from the lubricant feeder nozzle 15 flows through the egress area 6 into the clearance left around the circular outside contour 39, followed by pouring into the lubricant path 22 and then reaching the raceway defined between the circular raceway surfaces 41 and 42. Moreover, the injection hole 4 has a shoulder or a flat abutment 30 at the boundary between the ingress area 5 and the egress area 6. As a result, the lubricant feeder nozzle 15, when urged against the lubricating plug 25, is kept against wedging deep into the injection hole. Thus, the lubricant feeder nozzle 15 can be easily inserted into and/or withdrawn out of the ingress 5 of the lubricating plug 1. With the stud-type roller bearing with tracking wheel constructed as stated just above, the lubricating plug 25 is completely received in the lubrication hole 10 so as not to protrude into the hexagonal mouth 23 and, therefore, the fastening tool for the lubricant feeder nozzle 15 may be applied to the hexagonal mouth 23 whenever the operator wants to do so. Thus, the lubricant feeder nozzle 15 may be attached and/or detached with ease from the lubricating plug 25.

Figure 9:
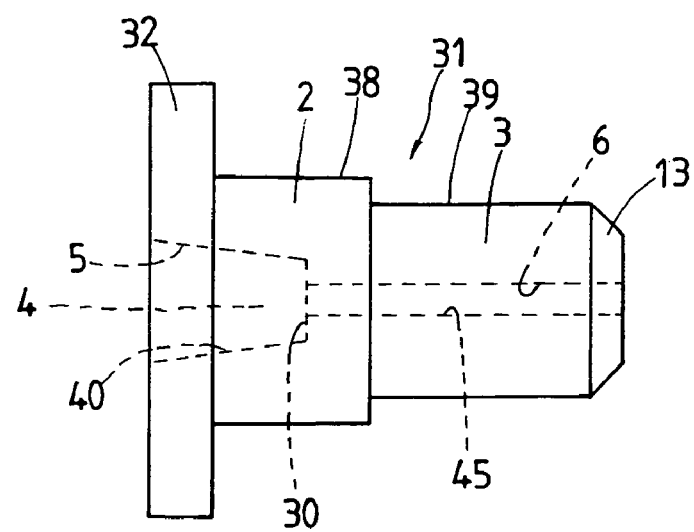
FIG. 9 is a view in front elevation showing a further another version of the lubricating plug according to the present invention.
Figure 10:
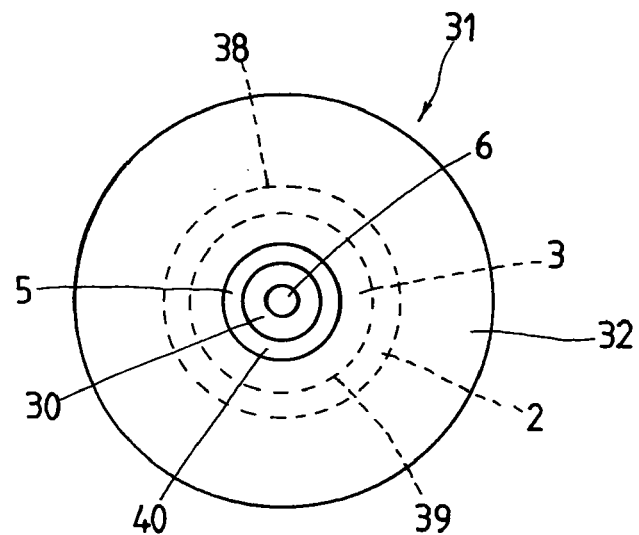
FIG. 10 is a view in left side elevation showing the lubricating plug of FIG. 9.

Referring to FIGS. 9 and 10, there is shown a further another version of the lubricating plug.

With a lubricating plug 31 according to this version, the radially enlarged portion 2 is provided integrally at an aft end thereof with a flange 32 that will come into abutment against a mating end of the inside race 14 of the stud 9. The lubricating plug 31, as shown in FIG. 9, is comprised of the radially enlarged portion 2, radially reduced portion 3, ingress area 5 and the egress area 6, which are all made in the same constructions as those in the first lubricating plug 1, but the radially enlarged portion 2 has the flange 32 at the aft end thereof. On installation of the lubricating plug 31 into the lubrication hole 10 in the stud-type roller bearing with tracking wheel, the flange 32 serves as stopper means to make it easier to set the lubricating plug 31 in the desired position with respect to the lubrication hole 10, where the egress area 6 of the injection hole 4 keeps the fluid communication of the lubrication hole 10 in the stud 6 with the lubricant path 22.

Figure 11:
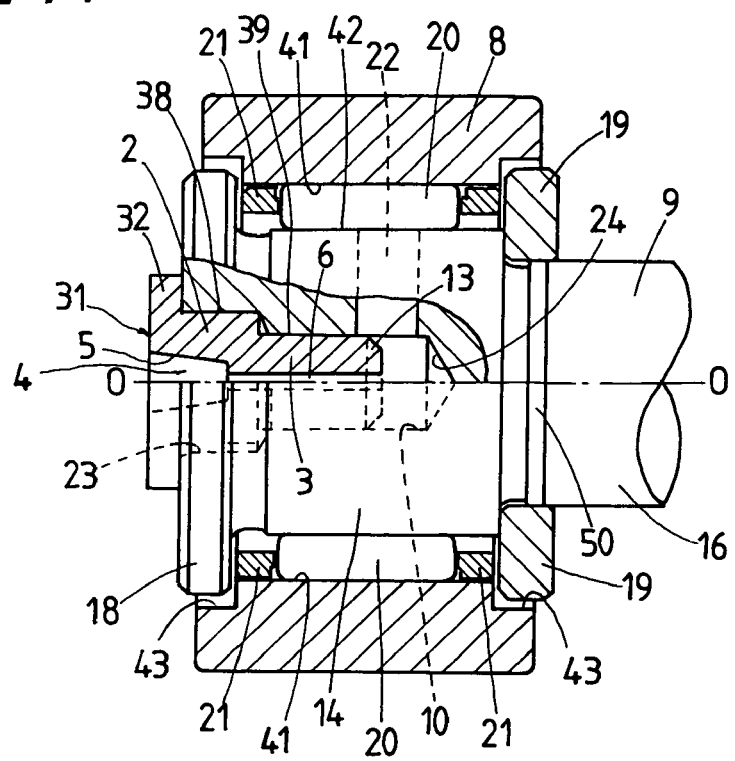
FIG. 11 is a fragmentary view in front elevation, partially in section and partially broken away, showing a further another version of a stud-type roller bearing with tracking wheel in which there is installed the lubricating plug of FIG. 9.

A further another version of the stud-type roller bearing with tracking wheel according to the present invention will be explained later with reference to FIG. 11.

This version of the stud-type roller bearing with tracking wheel is made substantially in the same construction as other versions stated earlier, but there is used the lubricating plug 31 other than the first and second lubricating plugs 1, 25. The lubricating plug 31 is accommodated in the stud-type roller bearing with tracking wheel, with the radially enlarged portion 2 being fit in the hexagonal mouth 23 while the radially reduced portion 3 being fit in the lubrication hole 10. In this version, the lubricating plug 31 is held in the desired position by drawing on the binding or fit pressure exerted between the radially reduced portion 3 and the mating lubrication hole 10 other than the binding pressure exerted between the radially enlarged portion 2 and the mating mouth 23. For mounting and/or dismantling of the stud-type roller bearing with tracking wheel in which the lubricating plug 31 is installed, the lubricating plug 31 has to be first taken off to allow any fastening tool accessing to the hexagonal mouth 23. To cope with this issue, the lubricating plug 31 has the flange 32 at the aft end thereof, which can be easily manipulated with fingers to remove the lubricating plug 31 out of the stud 9. Moreover, the lubricating plug 31 may be set in place in the stud 9 by only forcing it into the lubrication hole 10 until the flange 32 comes into abutment against the mating flange 18 of the stud 9. The stud-type roller bearing with tracking wheel remains dismantled of the lubricating plug 31 before mounted on any associated means or mating member. The lubricating plug 31 will fit into the stud-type roller bearing with tracking wheel, which has been once attached the mating member. The lubricating plug 31 is most suitable for the stud-type roller bearing with tracking wheel made tiny in construction. Further, the lubricating plug 31 fits into the stud 9 in a way the foremost end thereof is spaced apart from the deep bottom 24 of the lubrication hole 10. Regardless of whether the lubricant path 22 is made overlapped in position with the radially reduced portion 3, that is, intersected with reduced portion 3 or not, the lubricant applied may flow smoothly through the egress area 6 into the clearance left around the radially reduced portion 3, followed by pouring into the lubricant path 22 and then reaching the raceway defined between the circular raceway surface 41 of the stud 9 and the circular raceway surface 42 of the outer ring 8.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A lubricating plug adapted to fit into a lubrication hole formed in a roller bearing with a tracking wheel and a stud movable relative to one another to apply a lubricant between the tracking wheel and the stud, said plug comprising:

a radially enlarged portion having a cylindrical contour to fit into the lubrication hole, and a radially reduced portion extending in an axial direction from one end of the radially enlarged portion, having a cylindrical contour and being formed as a unit with the radially enlarged portion, the radially enlarged and reduced portions being formed as a unit by molding synthetic resin, wherein the radially reduced portion provides an annular clearance extending around the cylindrical contour thereof to ensure flow of lubricant around the radially reduced portion when the radially enlarged portion is fitted into the lubrication hole, wherein both the radially enlarged and reduced portions have an injection hole extending in an axial direction through the plug, the injection hole being configured to receive a lubricant feeder nozzle therein, wherein the injection hole extends through an ingress area open at an axial end of the radially enlarged portion and continues inwards in the axial direction to accommodate the lubricant feeder nozzle therein, and through an egress area which is adjacent to and smaller in diameter than the ingress area so as to communicate with the ingress area, wherein the ingress area tapers off from the axial end of the radially enlarged portion towards the egress area, wherein a boundary between the ingress area and the egress area has a flat abutment against which the lubricant feeder nozzle fitted into the injection hole in the axial direction through the plug comes into abutted engagement therewith, and wherein the radially reduced portion has two slots formed therein which extend to the outer circumference of the cylindrical contour, and which cross each other and communicate the egress area with the annular clearance around the radially reduced portion.

2. A roller bearing with a tracking wheel and a stud comprising:

an outer ring serving as the tracking wheel coming into rolling-contact with a raceway on any mating member, the stud including an inside race installed in the outer ring for rotation relative to one another and a shaft integral with the inside race and extending axially out of the outer ring, the inside race being provided therein with a lubrication hole, the shaft being cut with external threads around a free end area thereof, and more than one rolling element being interposed between the outer ring and the stud;

a lubricating plug having a radially enlarged portion having a cylindrical contour which is fitted into the lubrication hole made in the inside race and a radially reduced portion having a cylindrical contour formed as a unit with the radially enlarged portion and extending in an axial direction from one end of the radially enlarged portion, the radially enlarged and reduced portions being formed as a unit by molding synthetic resin, the radially reduced portion providing an annular clearance extending around the cylindrical contour thereof to ensure flow of lubricant around the radially reduced portion when the radially enlarged portion is fitted into the lubrication hole, wherein the radially enlarged and reduced portions have an injection hole extending in an axial direction of the plug, the injection hole being configured to receive a lubricant feeder nozzle therein, wherein the injection hole extends through an ingress area open at an axial end of the radially enlarged portion which tapers inwards in the axial direction to accommodate the lubricant feeder nozzle therein, and through an egress area which is adjacent to and smaller in diameter than the ingress area so as to communicate with the ingress area, wherein a boundary between the ingress area and the egress area has a flat abutment against which the lubricant feeder nozzle fitted into the injection hole in the axial direction through the plug comes into abutted engagement therewith, wherein the lubrication hole communicates with a mouth extending from the axial end of the inside race to mate with a fastening tool, wherein the radially reduced portion has at an end, two slots which cross each other and communicate the egress area with the annular clearance around the radially reduced portion, wherein the lubrication hole further communicates with a lubricant path intersecting with a raceway surface of the inside race, and the lubricant from the feeder nozzle, fitted into the lubrication hole, passes through the egress area, the slots and the annular clearance around the cylindrical contour of the radially reduced portion, to reach the lubricant path, and wherein a lubricant applied from the lubricant feeder nozzle received in the ingress area flows through the egress area of the lubricating plug and the slots into the annular clearance around the radially reduced portion, followed by pouring into the lubricant path arranged in a direction perpendicular to the lubrication hole.

* * * * *